US006711285B2

(12) United States Patent
Noguchi

(10) Patent No.: US 6,711,285 B2
(45) Date of Patent: *Mar. 23, 2004

(54) METHOD AND APPARATUS FOR CORRECTING THE DENSITY AND COLOR OF AN IMAGE AND STORAGE MEDIUM HAVING A PROGRAM FOR EXECUTING THE IMAGE CORRECTION

(75) Inventor: Takafumi Noguchi, Kanagawa (JP)

(73) Assignee: Fuji Photo Film Co., Ltd., Kanagawa (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/391,191

(22) Filed: Sep. 7, 1999

(65) Prior Publication Data

US 2003/0138143 A1 Jul. 24, 2003

(30) Foreign Application Priority Data

Aug. 9, 1998 (JP) .......................... 10-253655
Apr. 26, 1999 (JP) .......................... 11-118316

(51) Int. Cl.[7] .......................... G06K 9/00; G06K 9/38; G03F 3/08
(52) U.S. Cl. .......................... 382/162; 382/167; 382/272; 358/518
(58) Field of Search .......................... 382/162, 163, 382/164, 165, 167, 169, 170, 171–272, 190, 195, 274; 358/515, 518, 527

(56) References Cited

U.S. PATENT DOCUMENTS

| | | | | |
|---|---|---|---|---|
| 5,210,600 A | * | 5/1993 | Hirata | 358/76 |
| 5,557,688 A | * | 9/1996 | Nakamura | 382/164 |
| 5,606,630 A | * | 2/1997 | Maeda et al. | 382/167 |
| 5,745,262 A | * | 4/1998 | Tatsumi | 358/504 |
| 5,910,823 A | * | 6/1999 | Hanai | 348/630 |
| 5,926,563 A | * | 7/1999 | Yamazaki | 382/167 |
| 5,949,962 A | * | 9/1999 | Suzuki et al. | 348/577 |
| 6,023,524 A | * | 2/2000 | Yamaguchi | 382/162 |
| 6,295,087 B1 | * | 9/2001 | Nohda | 348/234 |

* cited by examiner

*Primary Examiner*—Andrew W. Johns
*Assistant Examiner*—Amir Alavi
(74) *Attorney, Agent, or Firm*—Birch, Stewart, Kolasch & Birch, LLP

(57) ABSTRACT

An image correcting method corrects the density and color of an image. The method determines, from an original color image, first image data including higher spatial frequency components of the original color image and second image data in which the high frequency component is removed or reduced. Color correction is performed on the original color image by using the first image data. Density correction is performed on the original color image by using the second image data. Thus, it is possible to perform the color correction and density correction with accuracy all of the time.

17 Claims, 6 Drawing Sheets

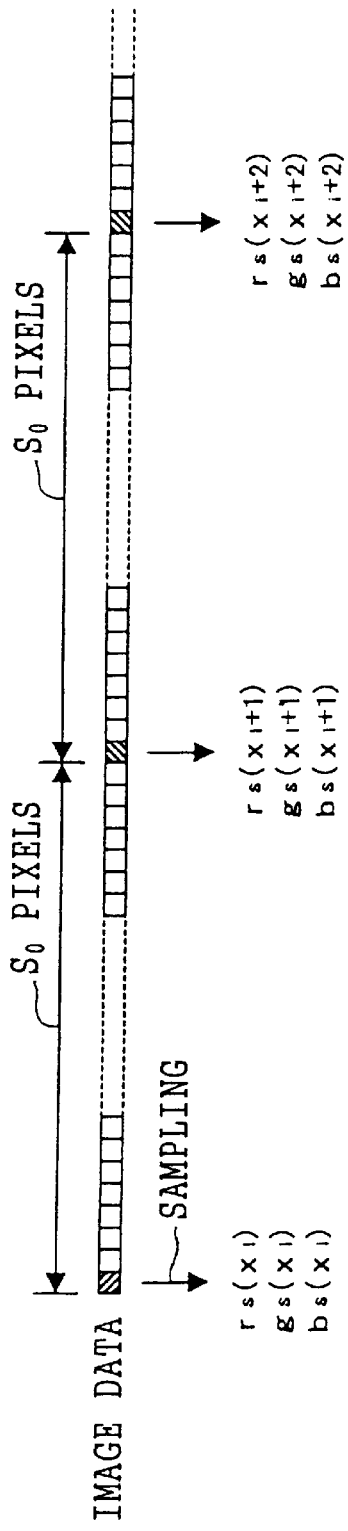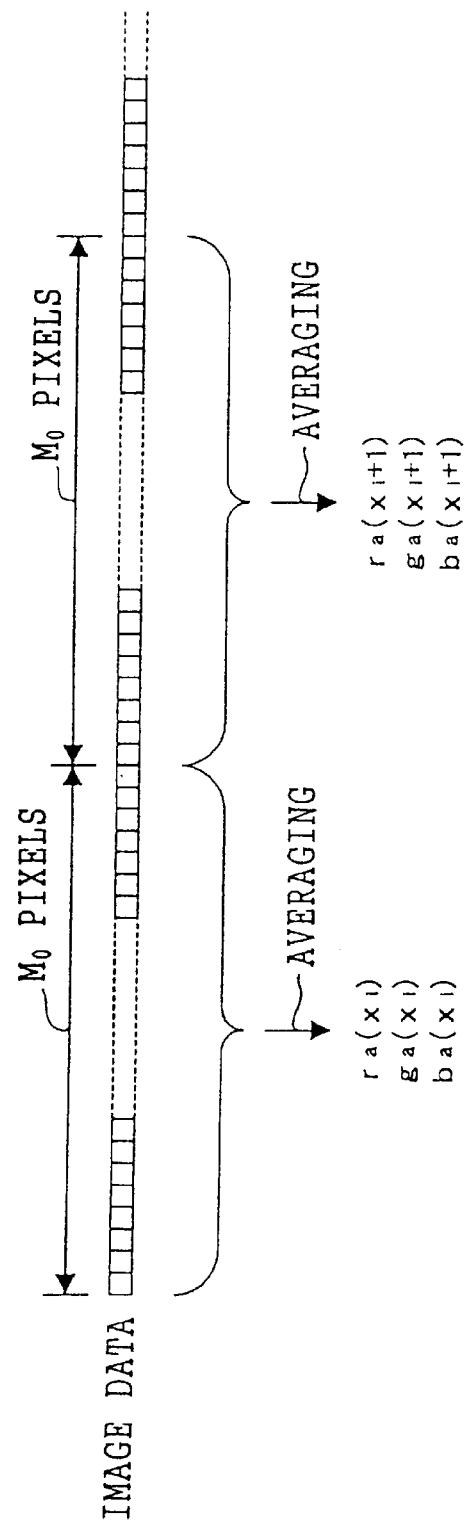
F I G. 4A  SAMPLING OF IMAGE DATA
F I G. 4B  CALCULATION OF AVERAGED SAMPLING VALUE

METHOD AND APPARATUS FOR CORRECTING THE DENSITY AND COLOR OF AN IMAGE AND STORAGE MEDIUM HAVING A PROGRAM FOR EXECUTING THE IMAGE CORRECTION

BACKGROUND OF THE INVENTION

1. Field of the Invention

The present invention relates to an image correcting method, an image correcting apparatus and a storage medium. In particular, the present invention relates to an image correcting method for correcting the density and color of an image, an image correcting apparatus capable of applying the image correcting method, and a storage medium in which a program for executing the image correcting method in a computer is stored.

2. Description of the Related Art

Color correction such as white balance adjustment or density correction for normalizing the density of the entire image need be performed on analog image signals or image data obtained by photography using a video camera or a digital still camera. In general, the color correction and density correction of an image are performed as follows: an image signal or image data is sampled for each of a plurality of channels (for example, red, green and blue), and then, an average value is calculated for each channel based on the data for each channel obtained by the sampling. Based on the calculated average values, a correction value for the color correction and a correction value for the density correction are then determined such that the average value relating to chromaticity becomes a neutral color (gray) in the color correction and the average value relating to luminance becomes an intermediate value (a numeral such as "0.75" issued in the case of reflection density, and "118" issued in the case of image data representing the density of each pixel in 8 bits) in the density correction, thus adjusting (converting) the image signal or image data.

In this specification, besides a simple average, the term "an average" also generally signifies various evaluation values similar to an average value such as a value obtained by dividing the entire screen into a plurality of regions, as is the case with division photometry or evaluation photometry, calculating the average value of each region, and synthesizing the average values of each region by the use of weighting coefficients which are different for each region.

As for the color correction and density correction of the image, an improvement in correction accuracy has been demanded, and further, for example, an improvement in operational stability has been demanded, that is, that images representing similar scenes can be corrected with similar correction values or that the malfunction rate be reduced. In order to improve the operational stability and achieve stable correction results by correcting the color and density of images representing similar scenes, it is necessary to stabilize an average to be used for the calculation of the correction values for the color correction and the density correction.

In view of this, the average has been conventionally stabilized by devising an algorithm exclusively for determining the average (as disclosed, for example, in Japanese Patent Application Laid-open (JP-A) No. 3-160891). However, as for both the color correction and the density correction, it has not been easy to achieve both an improvement in correction accuracy and an improvement in operational stability at the same time. Moreover, problems, such as variations existing in the accuracy of the color correction and the density correction for each image, have also arisen.

SUMMARY OF THE INVENTION

The present invention has been accomplished in an attempt to solve the above problems experienced in the prior art. Therefore, an object of the present invention is to provide an image correcting method, an image correcting apparatus and a storage medium which enable color correction and density correction to be performed with high accuracy all the time.

Desired color correction of an image is to correct, to a neutral color, portions which were to be originally in a neutral color in an original image. As the ratio of data of the portion which should be in a neutral color included in data for obtaining the correction value for the color correction increases, the accuracy of the color correction based on the obtained correction value can be improved. Although most high luminance points or low luminance points in an original image are likely to be neutral color portions, the high luminance points or low luminance points in the original image are frequently a minute portion of the area of the original image, and therefore, the portions where high luminance points or low luminance points exist on the original image include high spatial frequency components. In contrast, the density correction of the image is to correct the average value relating to the luminance of the original image to an intermediate value. Consequently, if data indicative of the high luminance points or low luminance points in the original image is included in data for obtaining the correction value for the density correction, the average value relating to the luminance of the original image is liable to fluctuate, thereby inducing deterioration in the accuracy and stability of the density correction.

In an image correcting method according to a first aspect of the present invention, color correction of a original color image is performed by using first image data including higher spatial frequency components of the original color image, and density correction of the original color image is performed by using second image data in which the high frequency component is removed or reduced.

In the first aspect, the color correction is performed on the original color image by using the first image data including the high frequency component of the original color image. Since the first image data includes the high frequency component of the original color image, data of high luminance points or low luminance points of a small area in the original color image, in which a number of data of portions to be a neutral color are included is also stored. Consequently, it is possible to perform the color correction with high accuracy.

Furthermore, in the first aspect, the density correction is performed on the original color image by using the second image data. Since the high frequency component of the original color image is removed from or reduced in the second image data, the variations of the luminance at the portions where the high luminance points or low luminance points exist in the original color image become dull (averaged) in the second image data, thereby preventing or alleviating any adverse effect of the high luminance points or low luminance points in the original color image on the accuracy and stability of the density correction. Consequently, in the first aspect, it is possible to perform the color correction and the density correction with high accuracy all the time.

Some apparatuses for producing image data (for example, a digital still camera for photographing an object so as to produce image data, a scanner for scanning an image recorded on a storage medium such as a photographic film so as to produce image data, or the like) are so constructed as to produce the image data corresponding to the first image data according to the present invention and the image data corresponding to the second image data according to the present invention. Some apparatuses for processing input image data to output it (for example, various image processors, various interface circuits, or the like) are so constructed as to produce the image data corresponding to the second image data according to the present invention upon inputting of the image data corresponding to the first image data according to the present invention so as to output data for each image. According to the present invention claimed in claim 1, there may be used the first image data and the second image data produced by the above-described apparatuses or obtained from the original color image, as described below.

In an image correcting method according to a second aspect, first image data including higher spatial frequency components of the original color image and second image data, in which the high frequency component is removed or reduced, are determined from a original color image; color correction of the original color image is performed by using the first image data; and density correction of the original color image is performed by using the second image data.

In the second aspect, the first image data including the high frequency component of the original color image is determined from the original color image, and the color correction of the original color image is performed by using the first image data. As described above, since the first image data includes the high frequency component of the original color image, the data at the high luminance points or low luminance points of a small area in the original color image, in which a number of data of portions to be a neutral color are included, is also held. Consequently, it is possible to perform the color correction with high accuracy, in the same manner as the first aspect.

Furthermore, in the second aspect, the second image data, from which the high frequency component of the original color image is removed or reduced, is determined from the original color image, and the density correction of the original color image is performed by using the second image data. As described above, since the high frequency component of the original color image is removed from or reduced in the second image data, the variations in luminance at the portions where the high luminance points or low luminance points exist in the original color image become dull (averaged) on the second image data, thereby preventing or alleviating any adverse effect of the high luminance points or low luminance points in the original color image on the accuracy and stability of the density correction. Thus, it is possible to perform the color correction and the density correction with high accuracy all the time according to the present invention of claim 2, in the same manner as the first aspect.

In the case where the original image data representing the original color image is present already, then, for example, the original image data can be used as the first image data as it is, while the second image data can be determined by filtering the original image data so as to remove or reduce the high frequency component. However, as claimed in claim 3, it is preferable that the first image data should be determined by selecting data of one pixel from the original image data representing the original color image every predetermined number of pixels; and that the second image data should be determined by calculating an average value from the original image data every predetermined number of pixels.

In the third aspect, since the first image data is determined by selecting the data of one pixel from the original image data every predetermined number of pixels, it is possible to reduce a quantity of the first image data without deteriorating the high frequency component of the original color image included in the original image data. Furthermore, since the second image data is determined by calculating the average value every predetermined number of pixels based on the original image data, it is possible to obtain the second image data, in which the high frequency component can be removed or reduced without performing any complicated processing such as filtering.

In the third aspect, it is possible to obtain the first image data by obtaining the average value by selecting pixel data from a plurality of pixels every predetermined number of pixels from the original image data instead of by selecting pixel data from one pixel every predetermined number of pixels (the number of the plurality of pixels should desirably not be of a size that the high frequency component of the original image is attenuated).

In an image correcting method according to a fourth aspect, an average value relating to chromaticity per first small region of a minute area at points on a original color image is determined; an average value relating to luminance per second small region greater in area than the first small region at the points on the original color image is determined; color correction of the original color image is performed based on the average value relating to chromaticity; and density correction of the original color image is performed based on the average value relating to luminance.

Since the first small region has a small area, the values indicating the chromaticity of the high luminance points or low luminance points located in the original color image are included at a high rate in the values relating to the chromaticity per first small region at the portions on the original color image. The average value relating to the chromaticity per first small region becomes a value remarkably reflecting the chromaticity of the high luminance points or low luminance points located in the original color image, i.e., the chromaticity at the portions to be a neutral color. According to the present invention of claim 4, since the color of the original color image is corrected based on the average value relating to the chromaticity per first small region having a small area at the portions on the original color image, the color correction can be performed with high accuracy.

Moreover, since the area of the second small region is greater than that of the first small region, the value relating to the luminance per second small region becomes an approximation to the average value relating to the luminance of the original image by averaging the luminance at each portion within the second small region even if the high luminance points or low luminance points exist within the second small region. According to the invention of claim 4, the average value relating to the luminance per second small region is determined at the portions on the original color image, and then, the density of the original color image is corrected based on the average value relating to the luminance, thereby preventing or alleviating any adverse effect of the high luminance points or low luminance points in the original color image on the accuracy and stability of the density correction so as to allow the density correction to be performed with high accuracy. Thus, it is possible to perform the color correction and the density correction with high accuracy all the time according to the fourth aspect, in the same manner as the second aspect.

An image correcting apparatus according to a fifth aspect comprises correction means for performing color correction on a original color image by using first image data including higher spatial frequency components of the original color image, and for performing density correction on the original color image by using second image data in which the high frequency component is removed or reduced.

In the fifth aspect, since the correction means performs the color correction on the original color image by using the first image data including the high frequency component of the original color image and the density correction on the original color image by using the second image data, in which the high frequency component of the original color image is removed or reduced, it is possible to perform the color correction and the density correction with high accuracy all the time, in the same manner as the first aspect.

In the fifth aspect, the first image data used for the color correction by the correction means and the second image data used for the density correction by the correction means may be obtained by, for example, providing acquiring means for acquiring the first image data including the high frequency component of the original color image and the second image data, in which the high frequency component is removed or reduced (for example, acquiring them from an apparatus for producing the above-described image data); otherwise, it may be obtained from the original color image as described below.

That is, an image correcting apparatus according to a sixth aspect comprises: arithmetical means for determining, from a original color image, first image data including higher spatial frequency components of the original color image and second image data in which the high frequency component is removed or reduced; and correction means for performing color correction on the original color image by using the first image data and for performing density correction on the original color image by using the second image data.

In the sixth aspect, the first image data including the high frequency component of the original color image and the second image data, in which the high frequency component of the original color image is removed or reduced, are determined from the original color image by the arithmetical means. The correction means performs the color correction on the original color image by using the first image data and the density correction on the original color image by using the second image data. Therefore, it is possible to perform the color correction and the density correction with high accuracy all the time, in the same manner as the second aspect.

A storage medium according to a seventh aspect stores therein programs for allowing a computer to execute processings including the step of performing color correction on a original color image by using first image data including higher spatial frequency components of the original color image, and the step of performing density correction on the original color image by using second image data in which the high frequency component is removed or reduced.

The storage medium according to the seventh aspect stores the program for allowing the computer to execute the processing including the above steps, i.e., the processings in the image correcting method according to the first aspect. Consequently, the computer reads out the program stored in the storage medium to execute it, so that it is possible to perform the color correction and the density correction with high accuracy all the time, in the same manner as the first aspect.

A storage medium according to an eighth aspect stores therein programs for allowing a computer to execute processings including the first step of determining, from a original color image, first image data including higher spatial frequency components of the original color image and second image data in which the high frequency component is removed or reduced; and the second step of performing color correction on the original color image by using the first image data and performing density correction on the original color image by using the second image data.

The storage medium according to the eighth aspect stores the program for allowing the computer to execute the processings including the above first and second steps, i.e., the processings in the image correcting method according to the second aspect. Consequently, the computer reads out the program stored in the storage medium to execute it, so that it is possible to perform the color correction and the density correction with high accuracy all the time, in the same manner as the second aspect.

BRIEF DESCRIPTION OF THE DRAWINGS

FIG. 4A conceptually illustrates the sampling of image data for the color correction; and FIG. 4B conceptually illustrates the calculation of an averaged sampling value for the density correction.

DESCRIPTION OF THE PREFERRED EMBODIMENTS

Preferred embodiments according to the present invention will be described in detail below with reference to the drawings.

First Embodiment

Figure 1:
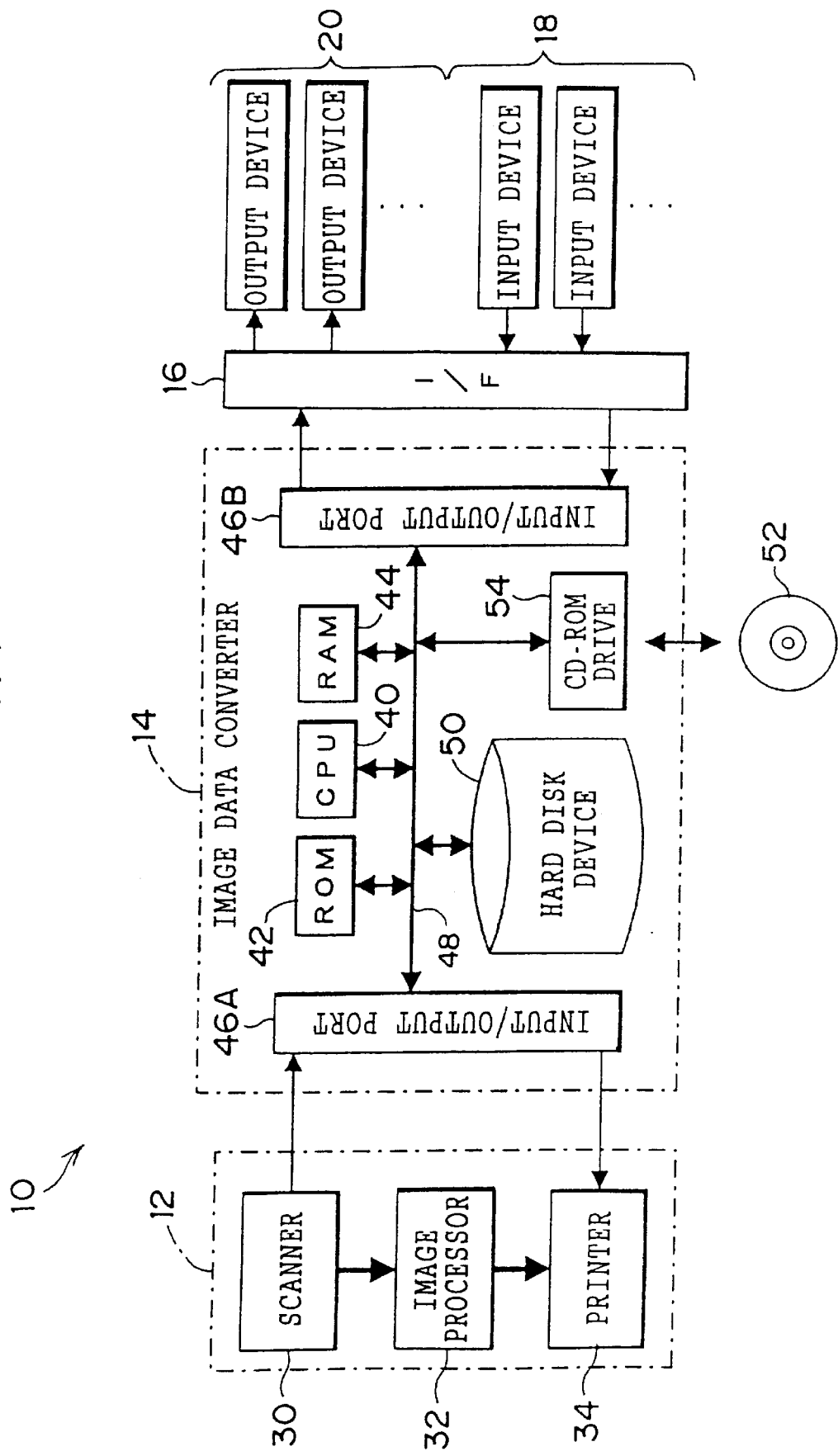
FIG. 1 is a block diagram illustrating the schematic structure of an image processing system according to an embodiment of the present invention.

FIG. 1 illustrates an image processing system 10 in the present embodiment. The image processing system 10 is constituted such that an input device group 18 and an output device group 20 are connected, via an image data converter 14 and an interface (I/F) circuit 16, to a digital laboratory system 12 which is constituted in such a manner as to read a film image (a negative image or a positive image visualized by development after an object has been photographed) recorded on a photographic photosensitive material (hereinafter simply referred to as "a photographic film") such as a photographic film (for example, a negative film or a reversal film) so as to record it on photographic paper at a high speed.

The input device group 18 consists of various input devices for inputting image data into the image data converter 14. As the input devices constituting the input device group 18, there can be used an information storage medium reader 22 (see FIG. 2) in which is set an information storage medium, for example, a magnetic disk such as a floppy disk (FD), an optical disk such as a CD-R, a magneto-optical disk (MO), a PC card or an IC card (hereinafter generally referred to as "a digital camera card") loadable in a digital still camera (DSC) hereinafter simply referred to as "a digital camera") or the like, and image data stored in the set information storage medium allowing the image data to be input; a communication controller (not shown) which receives image data transmitted from other information processing devices connected thereto via a communication line so as to allow image data to be input; and the like.

Figure 2:
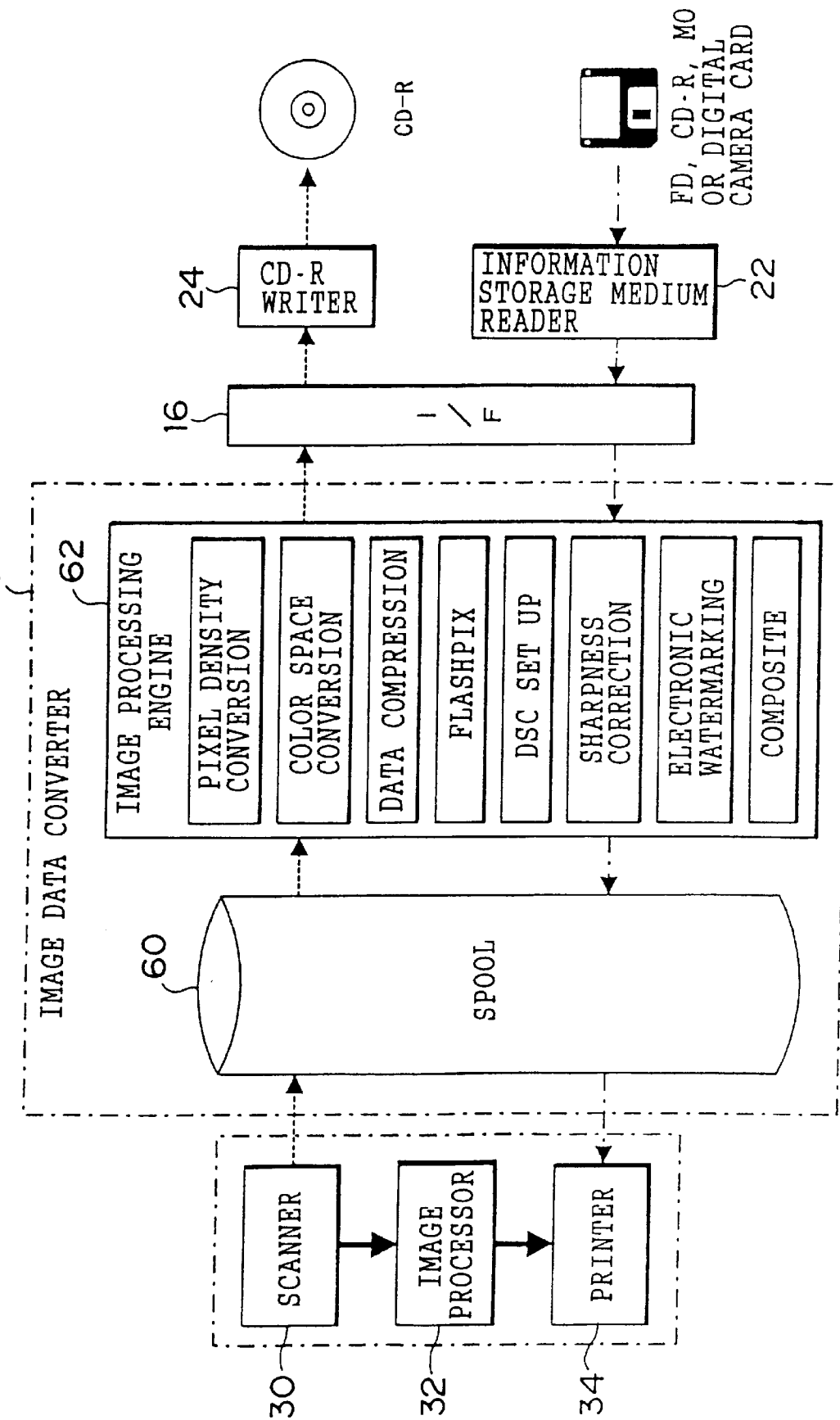
FIG. 2 is a diagram conceptually illustrating the processing of image data in the case where an information storage medium reader is connected as an input device and a CD-R writer is connected as an output device in the image processing system of FIG. 1.

The output device group 20 is structured from various output devices for performing image output processing based on outputting image data which is transferred from the image data converter 14. The output devices constituting the output device group 20 include, for example, an information storage medium writer for writing image data to an information storage medium (for example, a CD-R) as image output processing (as one example, FIG. 2 illustrates a CD-R writer 24 for writing image data into a CD-R serving as an information storage medium); an image display device for displaying an image on display means such as a display unit as image output processing; a communication controller for transmitting image data to other information processing devices connected thereto via a communication line as image output processing; and the like.

The file structures of the image data to be input from the input devices constituting the input device group 18 are not constant and are different from each other in most cases. Therefore, the I/F circuit 16 determines the file structure of the image data input upon receipt of the image data from the input device, and then, converts the file structure into a predetermined file structure and inputs the data into the image data converter 14. In contrast, the output device specifies in advance a file structure of the image data to be transferred from the outside. However, there are often as many file structures as there are output devices constituting the output device group 20. Consequently, when image data is transferred from the image data converter 14 to the output device the I/F circuit 16 converts the file structure of the image data being transferred into a file structure which accords with the output device at the output destination.

The digital laboratory system 12 includes a scanner 30, an image processor 32 and a printer 34 which are connected in series. The scanner 30 is provided with a reading sensor such as an area CCD sensor, which reads a film image recorded on a photographic film. Image data obtained by reading the film image is output to the image processor 32, to be used for image output processing by the printer 34 (recording the image on photographic paper). Furthermore, image data, which is instructed also to be used for image output processing by an output device other than the printer 34, is also output to the image exchanging unit 14.

The image processor 32 is provided with various image processing circuits (not shown) for performing a variety of image processings on the input image data for exposure recording an image of a proper image quality on photographic paper such as pixel density conversion, color conversion, hyper tone processing for compressing the gradation of very low frequency luminance components of an image, hyper sharpness processing for emphasizing sharpness while suppressing graininess, special image processing [e.g. correction of deterioration in the quality of a film image photographed and recorded using an LF(film-fitted lens package) caused by aberration of the lens of the LF, correction of red-eye effect, and the like]. The image processor 32 calculates the processing conditions of the image processing to be performed by each of the image processing circuits. Each of the image processing circuits performs image processing on the image data according to the calculated processing conditions, and the image data after the image processing is output to the printer 34 as recording image data.

The printer 34 includes laser light sources of red, green and blue and laser drivers (not shown) for controlling the operation of the respective laser light sources, and is adapted to modulate red, green and blue laser light emitted from the laser light sources based on the input recording image data. The modulated laser beams then scan the photographic paper. Consequently, the image is exposure recorded on the photographic paper. The photographic paper, on which the image is exposure recorded, is fed to an unillustrated processor unit and undergoes color development, bleaching/fixing, washing and drying processings, thereby visualizing the image exposure recorded on the photographic paper. Note that the modulated laser light is used for exposure recording the image of image data transferred from the image data converter 14 to the printer 34 on the photographic paper, in the same manner as described above.

As shown in FIG. 1, the image data converter 14 comprises: an information processor such as a personal computer or a work station including a CPU 40, a ROM 42, a RAM 44, input/output ports 46A and 46B, all of which are connected via a bus 48; a hard disk device 50 incorporating therein an information storage medium (a hard disk) of a large capacity and being connected to the bus 48; and a CD-ROM drive 54 for reading a program or the like from a CD-ROM 52 loaded therein. To the input/output port 46A are connected the scanner 30 and the printer 34 in the digital laboratory system 12; meanwhile, to the input/output port 46B are connected the input device group 18 and the output device group 20 via the I/F circuit 16.

The image data converter 14 temporarily stores the image data input from the scanner 30 or the input devices of the input device group 18 in the hard disk incorporated in the hard disk device 50. Consequently, the hard disk incorporated in the hard disk device 50 functions as a spool 60 (see FIG. 2) for accumulating and storing the image data input in the image data converter 14. Furthermore, the image data converter 14 adds property information representing attributes or the like of the image data to the input image data, before temporarily storing the input image data in the spool 60.

In the hard disk incorporated in the hard disk device 50 are stored a variety of image processing programs for performing various image processings on the image data. The CPU 40 in the image data converter 14 selectively executes these programs at a predetermined timing (i.e., at least either one of a timing before the image data is temporarily stored in the spool 60 and a timing after the image data temporarily stored in the spool 60 is read), as required, so as to perform the various image processings on the image data. In this way, the image data converter 14 is provided with a function of an image processing engine 62 (see FIG. 2) for performing the various image processings.

In the present embodiment, as shown also in FIG. 2, various image processings for the image data are prepared. These include "pixel density conversion" for converting the image data into image data having a different pixel density (i.e., the number of pixels); "color space conversion" for converting the image data into image data having a different color space; "data compression (or decompression)"; "FlashPix formatting" for converting (or reversely converting) the image data into image data having a predetermined format termed "FlashPix" [i.e., a format including image data of a plurality of kinds of resolutions (pixel densities) different from each other, wherein the image data of each different resolution is divided into a plurality of small regions (termed "tiles")]; "DSC set up" for improving the image quality for image data obtained by photography using a digital camera; "sharpness correction" for enhancing the sharpness of the image; "electronic watermarking" for embedding in the image data specific electronic watermarking data so as to prevent inaccurate duplication of image data; and "Composite" for synthesizing a plurality of kinds of image data into single image data (for example, image data for creating a New Year's greeting card or the like).

Among the aforementioned various image processings, "the DSC set up" processing comprises color correction and density correction processing, in which the image correcting method according to the present invention is applied (described in detail later), and color conversion processing for brightening the color of the image. A color correction/density correction program for allowing the CPU 40 in the image data converter 14 to execute the color correction and density correction is initially stored in the CD-ROM 52 together with programs for allowing the CPU 40 to execute other image processings. When the CD-ROM 52 is loaded in the CD-ROM drive 54 to instruct installation of the program from the CD-ROM 52 to the image data converter 14, the CD-ROM drive 54 reads the color correction/density correction program or other programs from the CD-ROM 52, to store them into the hard disk incorporated in the hard disk device 50.

When the time arrives for the color correction and the density correction to be executed, the color correction/density correction program is read from the hard disk incorporated in the hard disk device 50, is then stored in the RAM 44 (alternatively, the image processing programs may be read at the time the power source of the image data converter 14 is turned on and then stored in the RAM 44), and thus, is executed by the CPU 40 in the image data converter 14. In this way, the image data converter 14 functions as the image correcting apparatus according to the present invention. Note that the other image processing programs are read and executed in the same manner as described above.

As described above, the CD-ROM 52 and the hard disk incorporated in the hard disk device 50 storing the color correction/density correction program or other image processing programs correspond to the storage medium according to the present invention.

In an exemplary aspect (see FIG. 2) of the present embodiment in which the information storage medium reader 22 (and the CD-R writer 24) is connected to the image data converter 14, an explanation now be given on transfer of the image data from the information storage medium reader 22 to the printer 34 in the digital laboratory system 12.

In the image processing system 10, an FD or an MO storing image data processed by an information processor such as a personal computer owned by a user is brought in and the creation of a print requested. Alternatively, a digital camera card storing image data obtained by photography using a digital camera may be brought in and the creation of a print requested; or a CD-R, on which image data transferred from the scanner 30 through the image data converter 14 and the CD-R writer 24 is written, may be brought in and the creation of a print (or extra prints) requested.

In this case, the information storage medium brought in by the user is set in the information storage medium reader 22 (i.e., any of an FD drive, a CD drive, an MO drive, a card reader and the like). The information storage medium reader 22 having the information storage medium set therein reads the image data to be processed from the information storage medium, and then transfers the read image data to the image data converter 14 together with attribute information representing various attributes of the image data to be processed and the information that the output destination of the image data is the printer 34.

The image data transferred from the information storage medium reader 22 is converted into a predetermined file structure in the I/F circuit 16, and then, is input into the image data converter 14. When the image processing engine 62 in the image data converter 14 confirms that the image data is input from the information storage medium reader 22 and that the input image data to be processed is image data to be output to the printer 34 based on the information representing the output destination of the image data input together with the image data, it performs the optimum image processing for the attributes of the image data to be processed and the output destination (i.e., the printer 34) depending on the input source (i.e., the type of the information storage medium reader 22) before the image data to be processed is stored on the spool 60.

Here, in the case where the input source, i.e., the information storage medium reader 22 is a device (a card reader) for reading the image data from the digital camera card, the image processing engine 62 determining that the input image data is image data produced by photography using a digital camera and stored in the digital camera card. (in this case, the data is compressed and stored) The image processing engine 62 then performs various types of image processing such as decompressing the compressed image data, converting the decomposed image data into image data having a resolution (pixel density) suitable for the recording of an image on the photographic paper, performing DSC set up processing including the color correction and density correction, and carrying out sharpness correction for enhancing the sharpness of the image.

Referring to a flowchart of FIG. 3, a description will be given below of the color correction and density correction implemented by executing the color correcting/density correcting program by means of the image processing engine 62 (the CPU 40 in the image data converter 14) when the image data to be processed is image data read out from a digital camera card.

Zero is substituted for a variable n in step 100, and further, 1 is substituted for each of variables m, x, $x_i$ and $x_j$. In step 102, pixel data r(x), g(x) and b(x) representing the densities of red, green and blue colors of a pixel at a pixel position x are fetched from the image data to be processed. In step 104, it is determined whether or not the variable x (the pixel position x) is equal to "$n \times S_0 + 1$", wherein $S_0$ represents a constant, for example, 100 or the like. Since the variable x is initially set to 1 and the variable n is initially set to 0, the determination in step 104 is affirmative, and therefore, the routine proceeds to step 106.

In step 106, the pixel data r(x), g(x) and b(x) fetched in step 102 are held (sampled) as image data sampling values $r_s(x_i)$, $g_s(x_i)$ and $b_s(x_i)$.

$$r_s(x_i) \leftarrow r(x), g_s(x_i) \leftarrow g(x), b_s(x_i) \leftarrow b(x)$$

Next, in step 108, the variables $x_i$ and n are incremented by only 1.

In step 110, the pixel data r(x), g(x) and b(x) fetched in step 102 is converted into image receptor reflectivity data R(x), G(x) and B(x) representing the reflectivity of the image receptor for each color. Based on the Advice 709 of the International Radio Communication Consultative Committee, an image receptor reflectivity X (which ranges from 0 to 1) can be allocated to digital signal values of 8 bits (which range from 0 to 255) according to the following function F(X).

$$F(X) = \begin{cases} 255 \cdot (4.5 \cdot X) & (0.0 \leq X \leq 0.018) \\ 255 \cdot (1.099 \cdot X^{0.45} - 0.099) & (0.018 < X \leq 1.0) \end{cases}$$

Therefore, the conversion of the image data into image receptor reflectivity can be achieved by a reverse conversion of the function F (a conversion with the function $F^{-1}$) (see the following formulas).

$$R(x) \leftarrow F^{-1}(r(x)), G(x) \leftarrow F^{-1}(g(x)), B(x) \leftarrow F^{-1}(b(x))$$

In the next step 112, the image receptor reflectivity data R(x), G(x) and B(x) determined in step 110 are added to image receptor reflectivity integral values $R_0$, $G_0$ and $B_0$ (each of which is initially set to 0).

$$R_0 = R_0 + R(x), G_0 = G_0 + G(x), B_0 = B_0 + B(x)$$

In step 114, it is determined whether or not the variable x (the pixel position x) is equal to "m×$M_0$", wherein $M_0$ represents a constant, for example, 100 or the like. The constant $M_0$ may be equal to or different from the constant $S_0$. Since the variable x is initially set to 1 and the variable m is initially set to 1, the determination in step 114 is negative, and the routine proceeds to step 122.

In step 122, it is determined whether or not all pixel data is fetched. If the determination is negative, the variable x is incremented by 1, and the routine returns to step 102. In step 102, the data of a pixel adjacent to the pixel whose data was fetched the previous time is fetched in as pixel data r(x), g(x) and b(x). Consequently, in steps 122, 124 and 102, the data of each of the pixels is sequentially fetched from the image data to be processed in the ascending order of the pixel position x.

In the above-described steps 104 to 108, the pixel data is sampled as the image data sampling value and the variable n is incremented by 1 in the case where the variable x (the pixel position x) is equal to "n×$S_0$+1". Consequently, as illustrated in FIG. 4A, while the data of $S_0$ pixels is sequentially fetched, only the data of one pixel is selectively sampled as the image data sampling value (the sampling is performed by thinning out the data of ($S_0$−1) pixels).

In this way, the image data sampling value corresponds to first image data according to the present invention. The steps 104 to 108 constitute a portion of the arithmetical means as shown in the sixth aspect (more specifically, the arithmetical means for determining the first image data as shown in the third aspect). Furthermore, the region of the minute area on an original image (the image photographed using a digital camera), corresponding to the pixel whose data is sampled as the image data sampling value, corresponds to the first small region as shown in the fourth aspect.

In the above-described steps 110 and 112, the fetched pixel data is converted into the image receptor reflectivity data and is integrated in sequence. When the variable x (the pixel position x) is equal to "m×$M_0$" (namely, when the $M_0$ data is integrated), the determination in step 114 is affirmative, and the routine proceeds to step 116. In step 116, based on the image receptor reflectivity integral values $R_0$, $G_0$ and $B_0$, averaged sampling values $r_a(x_j)$, $g_a(x_j)$ and $b_a(x_j)$ are calculated according to the following equations:

$$r_a(X_j) = F\left(\frac{R_0}{M_0}\right) = F\left(\frac{\sum_{X=mM_0}^{(m+1)M_0-1} F^{-1}(r(x))}{M_0}\right)$$

$$g_a(X_j) = F\left(\frac{G_0}{M_0}\right) = F\left(\frac{\sum_{X=mM_0}^{(m+1)M_0-1} F^{-1}(g(x))}{M_0}\right)$$

$$b_a(X_j) = F\left(\frac{B_0}{M_0}\right) = F\left(\frac{\sum_{X=mM_0}^{(m+1)M_0-1} F^{-1}(b(x))}{M_0}\right)$$

wherein F represents the aforementioned function F(x).

In step 118, the image receptor reflectivity integral values $R_0$, $G_0$ and $B_0$ each are set to 0. In step 120, the variables $x_j$ and m are incremented by 1, respectively, and the routine proceeds to step 122. Consequently, in steps 110 to 120, the image receptor reflectivity are determined based on the data of $M_0$ pixels sequentially fetched, and further, values obtained by returning averages ($R_0/M_0$, $G_0/M_0$ and $B_0/M_0$) to digital signal values in 8 bits are set as averaged sampling values. As shown in FIG. 4B, the data of $M_0$ pixels is set as one unit, and the averaged value of the $M_0$ pixels is set as the average sampling value.

In this way, the averaged sampling value corresponds to second image data according to the present invention. The steps 110 to 120 constitute a part of the arithmetical means as shown in the sixth aspect (more specifically, the arithmetical means for determining the second image data as shown in the third aspect). Furthermore, the region on the original image (the image photographed using the digital camera) corresponding to the $M_0$ pixels used for calculation of one averaged sampling value corresponds to the second small region as shown in the fourth aspect.

If the determination is affirmative in step 122, the routine proceeds to step 126, and averages [r], [g] and [b] of the image data sampling values per channel are calculated based on image data sampling values $r_s(x_i)$, $g_s(x_i)$ and $b_s(x_i)$ (see the equations below). In the equations below, N represents the sum of the image data sampling values per channel. The averages [r], [g] and [b] of the image data sampling values correspond to the averages relating to chromaticity per first small region as shown in the fourth aspect.

$$[r] = \frac{\sum_{Xi=1}^{N} r_s(X_i)}{N}$$

$$[b] = \frac{\sum_{Xi=1}^{N} b_s(X_i)}{N}$$

$$[g] = \frac{\sum_{Xi=1}^{N} g_s(X_i)}{N}$$

In step 128, an average luminance value [v] is calculated in accordance with the equation below based on the averaged sampling values $r_a(x_j)$, $g_a(x_j)$ and $b_a(x_j)$. In the equation below, M represents the sum of the averaged sampling values per channel. The average luminance value [v] corresponds to the average relating to luminance per second small region as shown in the fourth aspect.

$$[v] = \frac{\sum_{X_j=1}^{M} 0.3 \cdot r_a(X_j) + 0.6 \cdot g_a(X_j) + 0.1 \cdot b_a(X_j)}{M}$$

In the next step 130, the color correction and the density correction are performed on the image data to be processed based on the averages [r], [g] and [b] of the image data sampling values per channel and the average luminance value [v]. There are various methods for the color correction and density correction. For example, the image data r, g and b to be processed are calculated in accordance with the following equation (1), thereby obtaining image data r', g', and b' after the color correction and density correction.

$$\begin{pmatrix} r' \\ g' \\ b' \end{pmatrix} = \frac{118 \cdot [g]}{[v]} \begin{pmatrix} 1/[r] & 0 & 0 \\ 0 & 1/[g] & 0 \\ 0 & 0 & 1/[b] \end{pmatrix} \begin{pmatrix} r \\ g \\ b \end{pmatrix} \quad (1)$$

At the right side in the equation (1), the determinant corresponds to the color correction for making up the averages of the red, green and blue channels and the coefficient term including the average luminance value [v] corresponds to the density correction for setting the average luminance value to "118". The above-described steps 126 to 130 correspond to correction means claimed in claim 6 and the step 130 corresponds to performing color correction based on the average relating to chromaticity and performing density correction based on the average relating to luminance as shown in the fourth aspect.

The image data sampling value is data obtained by sampling (selecting) the data of one pixel every $S_0$ pixels from the image data to be processed. Since the area of the region on the original image corresponding to the pixel whose data is sampled as the image data sampling value is minute, the image data sampling value includes data of high luminance points or low luminance points in the minute area in the original image or other points in the original image likely be a neutral color. In the above description, since the color correction is performed by the use of the averages [r], [g] and [b] of the image data sampling values, the color correction can be performed with high accuracy all the time. Image data of an original image representing a similar scene can also be corrected to have substantially the same color balance.

Moreover, the averaged sampling value is data obtained by calculating the average of every $M_0$ number of pixels from the image data to be processed. Since the area of the region on the original image corresponding to the $M_0$ pixels used for the calculation of one averaged sampling value is great, changes in luminance of the portions where the high luminance points or low luminance points exist in the original image can be averaged (namely, higher spatial frequency components in the original image can be removed or reduced), and thus, a value indicative of an intermediate density is set as an averaged sampling value. In the above description, since the density correction is performed by the use of the average luminance value [v] obtained from the averaged sampling value, it is possible to prevent or alleviate any adverse effect of the high luminance points or low luminance points in the original image on the accuracy and stability of the density correction, thereby allowing the density correction to be performed with high accuracy all the time. Image data of an original image representing a similar scene can be corrected to have substantially the same density.

Upon completion of the color correction, the density correction and other image processings, the image data converter 14 adds the property information to the image data to be processed and temporarily stores the image data in the spool 60. The image data converter 14 then informs the printer 34, which is the output destination of the image data, that the image data to be output to the printer 34 is stored in the spool 90. When the printer 34 gives an instruction for the image data to be taken out of the spool 90, the image data converter 14 takes the image data to be processed out of the spool 90 and transfers it to the printer 34.

The printer 34 exposure records the image onto the photographic paper 70 by the use of the image data transferred from the image data converter 14. Consequently, a printout is made by the use of the image data to be processed which is read from the digital camera card. The flow of the image data, from when the image data output from the information storage medium reader 22 is temporarily stored in the spool 60 until it is transferred to the printer 34, is indicated by the arrows of the dot-dash line in FIG. 2; namely, it goes from the information storage medium reader 22 to the printer 34 via the I/F circuit 16, the image processing engine 62 and the spool 60.

Second Embodiment

A description will now be given below of a second embodiment according to the present invention. The structure of the second embodiment is identical to that of the first embodiment. So, parts like or corresponding to those in the first embodiment are designated by the same reference numerals, and a description thereof is omitted. Hereinafter, an explanation will be given on only the areas of the operation of the second embodiment which are different from that of the first embodiment.

In one of various digital cameras commercially available at present, image data (thumbnail image data) termed a thumbnail image, the resolution of which is lowered in original image data, is produced by calculating an average value of the data of a plurality of pixels located at positions vicinal to each other on an image of image data (referred to as original image data) of a high resolution obtained by picking-up (photographing) an image and taking the average value as the value of the integrated plurality of pixels over the entire image. The produced thumbnail image data is written on a digital camera card together with the original image data (a digital camera in conformity with the "EXIF" standard).

Figure 5:
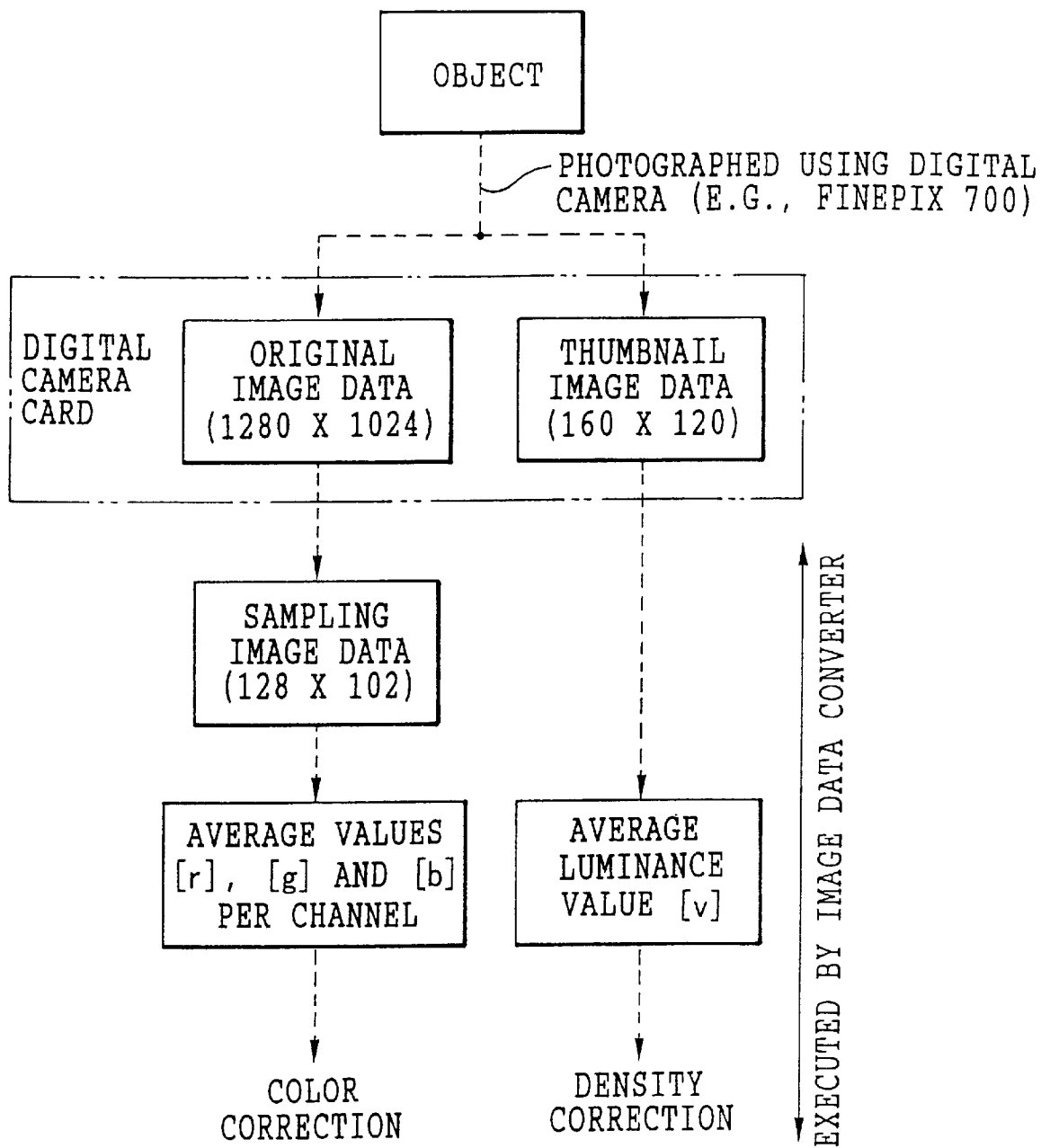
FIG. 5 imagewise illustrates the data flow for color correction processing and density correction in a second embodiment according to the present invention.

For example, in a digital camera "Finepix 700" manufactured by Fuji Photo Film Co., Ltd., when an object is photographed, thumbnail image data of 160 pixels×120 pixels is produced from original image data of 1280 pixels× 1024 pixels obtained by the photography, and the original image data and the thumbnail image data are written on the digital camera card (see FIG. 5). The thumbnail image data is used to, for example, list up, on a display, the image represented by the original image data stored in the digital camera card.

In the second embodiment, in the case where an information storage medium brought by a user is a digital camera card on which the thumbnail image data has been written together with the original image data by a digital camera having the above-described constitution, color correction and density correction are performed by using the thumbnail image data stored in the digital camera card as the second image data according to the present invention.

That is, in the case where the information storage medium brought by the user is a digital camera card on which the original image data and the thumbnail image data are written, an information storage medium reader 22 reads the thumbnail image data together with image data to be processed (the original image data), and then transfers the read original image data and thumbnail image data together with attribute information and information representing the output destination of the image data (in this case, a printer 34) to an image data converter 14.

Figure 6:
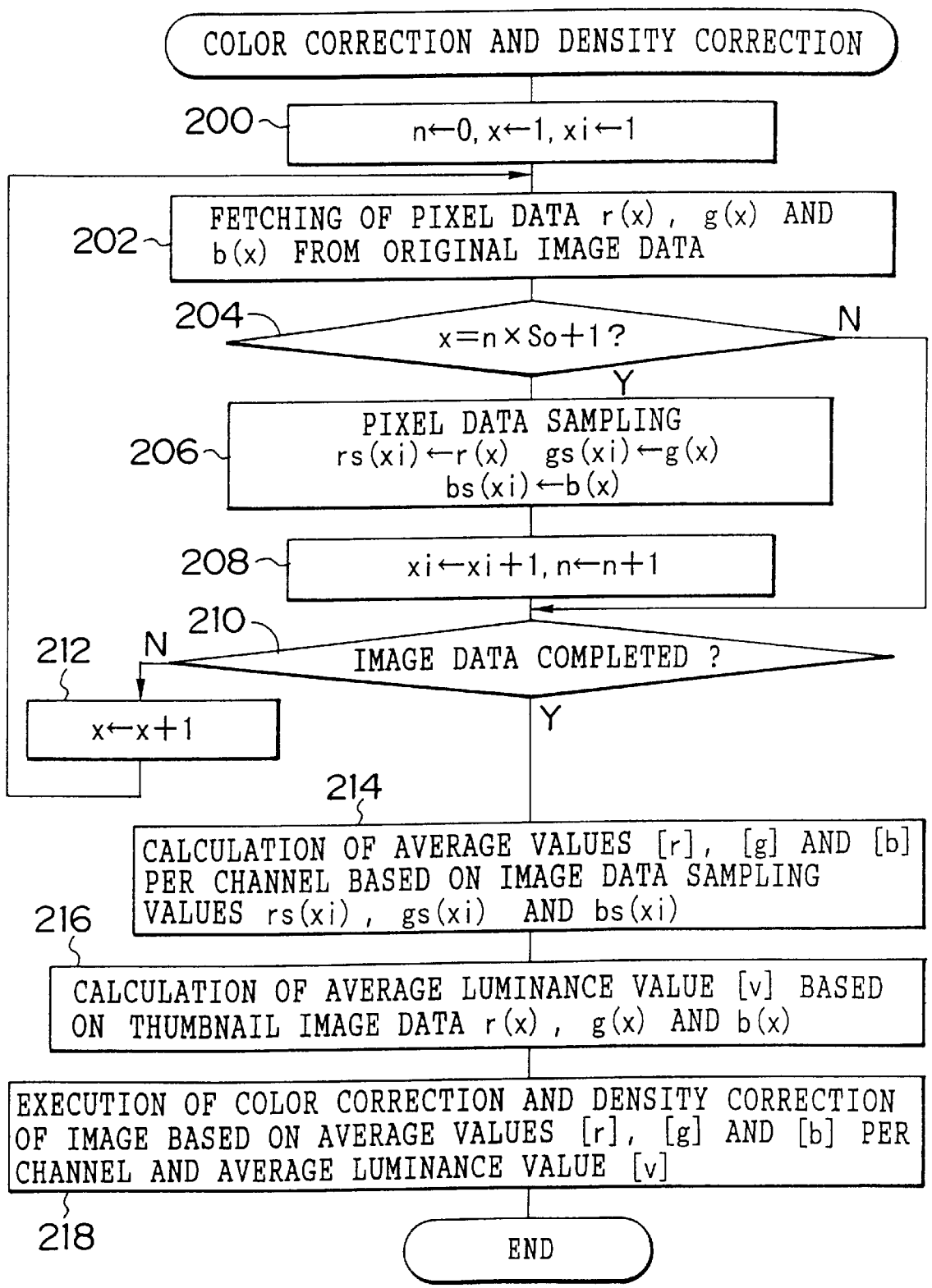
FIG. 6 is a flowchart illustrating the contents of the color correction and density correction processing in the second embodiment according to the present invention.

An image processing engine 62 in the image data converter 14 performs color correction and density correction as illustrated in FIG. 6 in the case where the information storage medium reader 22 at the input source is a device (a card reader) for reading the image data from the digital camera card and the thumbnail image data is input together with the normal image data (the original image data). Hereinafter, an explanation will be given of this color correction and density correction.

Zero is substituted for a variable n in step 200, and further, 1 is substituted for each of variables x and $x_i$. In step 202, pixel data r(x), g(x) and b(x) representing the densities of red, green and blue colors of a pixel at a pixel position x are fetched from the original image data. In step 204, in the same manner as in step 104 in FIG. 3, it is determined whether or not the variable x (the pixel position x) is equal to "$n \times S_0 + 1$". If the determination is affirmative, the routine proceeds to step 206. In step 206, in the same manner as in step 106 in FIG. 3, the pixel data r(x), g(x) and b(x) fetched from the original image data in step 202 are held (sampled) as image data sampling values $r_s(x_i)$, $g_s(x_i)$ and $b_s(x_i)$. In step 208, the variables $x_i$ and n are incremented by 1.

In step 210, it is determined whether or not all pixel data is fetched from the original image data. If the determination is negative, the variable x is incremented by 1 in step 212, and the routine returns to step 202. In step 202, the data of a pixel adjacent to the pixel whose pixel data was previously fetched, is fetched as pixel data r(x), g(x) and b(x).

Figure 3:
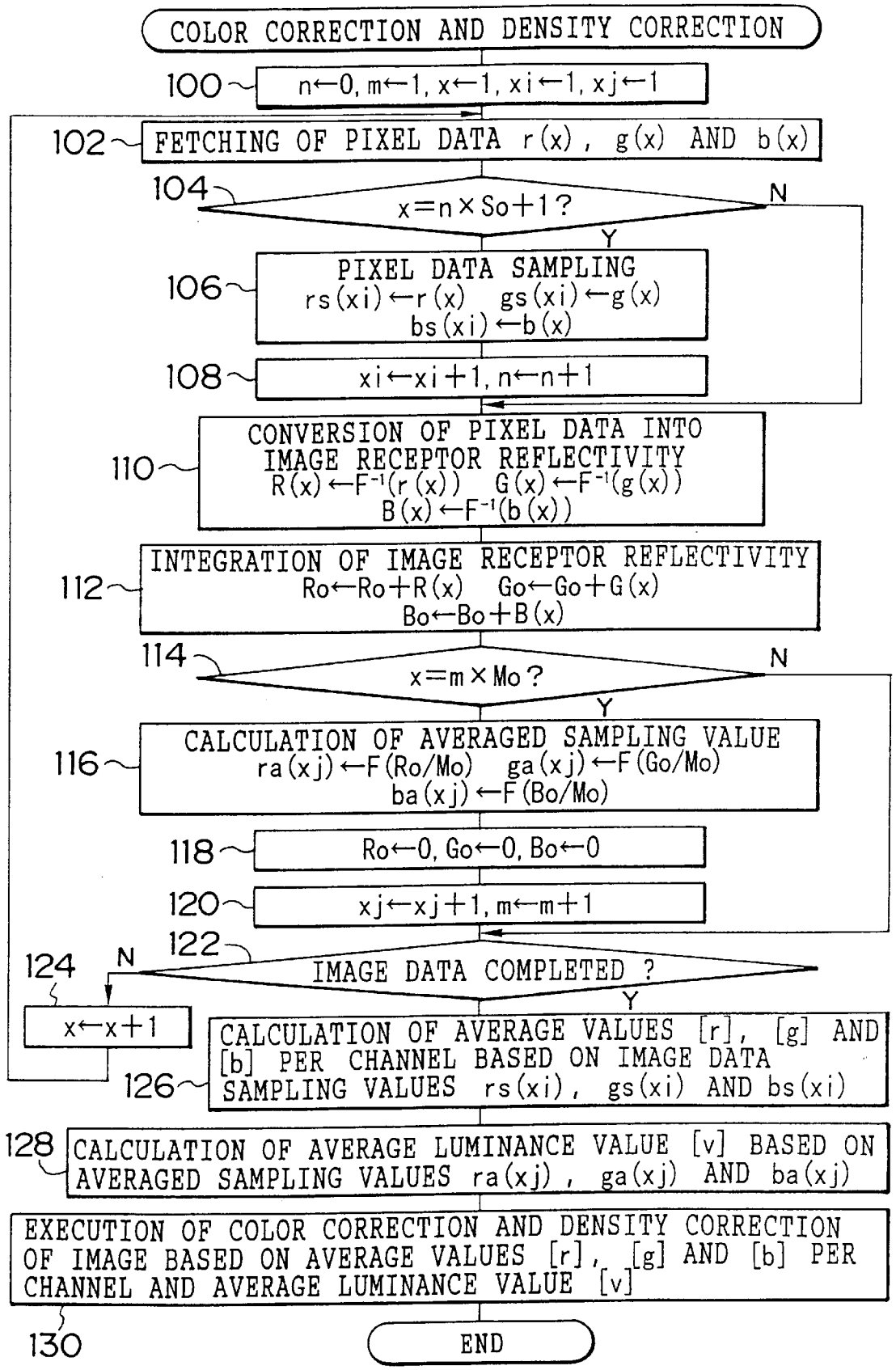
FIG. 3 is a flowchart illustrating the contents of the color correction and density correction processing in the first embodiment of the present invention.

Consequently, in steps 210, 212 and 202, the data of each of the pixels is sequentially fetched from the original image data in the ascending order of the pixel position x; in steps 204 to 208, only the data of one pixel is selectively sampled as an image data sampling value (the first image data according to the present invention) while the data of $S_0$ pixels are sequentially fetched, in the same manner as the color correction and density correction in FIG. 3 (the sampling is performed by thinning out the data of ($S_0-1$) pixels).

The image data sampling value corresponds to the sampling image data illustrated in FIG. 5. For example, if the original image data is image data of 1280 pixels×1024 pixels obtained by photography using the digital camera "Finepix 700" manufactured by Fuji Photo Film Co., Ltd., the sampling image data of, e.g., 128 pixels×102 pixels can be obtained by the above-described processings.

If the determination in step 210 is affirmative, the routine proceeds to step 214. Averages [r], [g] and [b] of the image data sampling values are calculated per channel based on the image data sampling values $r_s(x_i)$, $g_s(x_i)$ and $b_s(x_i)$, in the same manner as the step 126 in FIG. 4 (also see FIG. 5).

In step 216, the thumbnail image data is fetched, and then, an average luminance value [v] is calculated in accordance with the equation below based on the values r(x), g(x) and b(x) of pixels of the thumbnail image data (also see FIG. 5). In the equation below, M represents the number of pixels of the thumbnail image data. Among the processings in step 216, the processing of fetching the thumbnail image data constitutes acquiring means for acquiring the first image data and the second image data together with the preceding step 202.

$$[v] = \frac{\sum_{x=1}^{M} 0.3 \cdot r(x) + 0.6 \cdot g(x) + 0.1 \cdot b(x)}{M}$$

As described above, the thumbnail image data is image data produced by calculating the average value of the data of a plurality of pixels located at positions vicinal to each other on the image of the original image data and taking the average value as the value of the integrated plurality of pixels over the entire image, and therefore, it corresponds to the second image data according to the present invention.

Consequently, the production of the thumbnail image data in the digital camera corresponds to the determining of the second image data, in which higher spatial frequency components of the original color image is removed or reduced, from the original color image, as claimed in claim 2 (and specifically to the determining of the second image data by calculating the average value of every predetermined number of pixels from the original image data (the original image data) as shown in the third aspect), and further, corresponds to the determining of the density of each of red, green and blue colors per second small region greater in area than the first small region at points on the original color image, as shown in the fourth aspect.

In the next step 218, the color correction and density correction are performed on the image data to be processed based on the averages [r], [g] and [b] of the image data sampling values per channel and the average luminance value [v], in the same manner as in step 130 in FIG. 3. In this way, the processing of the calculating of the average luminance value [v] in steps 214 and 216 and the processing in step 218 correspond to the correction means as shown in the fifth aspect.

In the above-described color correction and density correction, since the color correction is performed by the use of the averages [r], [g] and [b] of the image data sampling values, the color correction can be performed with high accuracy all the time, in the same manner as the color correction and density correction in FIG. 3. Image data of an original image representing a similar scene can also be corrected to have substantially the same color balance.

Moreover, since the thumbnail image data is data obtained by calculating the averages of the plurality of pixels from the image data to be processed and the area in the region on the original image corresponding to one pixel of the thumbnail image data is great, the changes in luminance at the points, where the high luminance points or low luminance points are located in the original image, can be averaged (that is, the high frequency component in the original image can be removed or reduced), and thus, the value indicating the intermediate density is set as the value of each pixel of the thumbnail image data.

In the above-described color correction and density correction, since the density correction is performed by the use of the average luminance value [v] determined from the thumbnail image data, it is possible to prevent or alleviate any adverse effect of the high luminance points or low luminance points in the original image on the accuracy and stability of the density correction, thereby allowing the density correction to be performed with high accuracy all the time, in the same manner as the density correction and color correction in FIG. 3. Image data of an original image representing a similar scene can be corrected to have substantially the same density.

Although in the above embodiments, the CD-ROM 52 and the hard disk incorporated in the hard disk device 50 are exemplified as the storage mediums according to the present invention, the present invention is not limited to these examples. It is to be understood that various information storage mediums including a magnetic disk such as a floppy disk, an optical disk such as a CD-R, a magneto-optical disk such as an MO, a memory card and an IC card can be applicable to the storage medium according to the present invention.

Furthermore, in the above embodiments, the second image data (the averaged sampling value), in which the high frequency component in the original image is removed or reduced, is obtained by calculating the average value of every $M_0$ pixels based on the image data to be processed. Alternatively, the image data to be processed may be filtered to remove or attenuate the high frequency component so as to obtain the second image data according to the present invention.

Additionally, the CPU 40 in the image data converter 14 executes the color correcting/density correcting program to perform the color correction and density correction. However, the present invention is not limited to such processing. Special hardware (an image processing circuit) for performing the color correction and density correction may be provided for performing the color correction and density correction.

Furthermore, in the above embodiments, the object to be processed is the digital image data produced by photography using a digital camera, however, the data to be processed according to the present invention may also be an analog image signal. For example, the present invention is applicable to color correction and density correction in equipment for processing an analog image signal from, e.g., an analog video camera. Moreover, although both the color correction and the density correction are performed in the above embodiments, it is to be understood that only one of the corrections may be performed.

The preferred embodiments according to the present invention have been described above. The above-described embodiments include the following embodiments other than the embodiments as shown in the above aspects.

(1) An image correcting apparatus comprises: first arithmetical means for determining an average value relating to the chromaticity per first small region of a minute area at each point on a original color image; second arithmetical means for determining an average value relating to the luminance per second small region greater in area than the first small region at the points on the original color image; and correction means for performing color correction on the original color image based on the average value relating to the chromaticity calculated by the first arithmetical means and for performing density correction on the original color image based on the average value relating to the luminance calculated by the second arithmetical means.

(2) A storage medium stores therein programs for allowing a computer to execute processings including the first step of determining an average value relating to chromaticity per first small region of a minute area at points on a original color image and determining an average value relating to the luminance per second small region greater in area than the first small region at the points on the original color image; and the second step of performing color correction on the original color image based on the average value relating to the chromaticity and performing density correction on the original color image based on the average value relating to the luminance.

What is claimed is:

1. An image correcting method wherein color correction of an original color image is performed based on a first set of image data including higher spatial frequency components of the original color image, and density correction of the original color image is performed based on a second set of image data having a different frequency component than the first set of image data in which the higher spatial frequency components are removed or reduced from the original color image.

2. The image correcting method according to claim 1, wherein the higher spatial frequency components include a number of data portions to be a neutral color.

3. The image correcting method according to claim 1, wherein when the higher spatial frequency components are removed from or reduced from the original color image in the second set of image data, variations of luminance in the original color image becomes averaged in the second set of image data.

4. An image correcting method comprising the steps of:
determining, from an original color image, a first set of image data including higher spatial frequency components of the original color image and a second set of image data having a different frequency component than the first set of image data in which the higher spatial frequency components are removed or reduced from the original color image;
performing color correction on the original color image based on the first set of image data and performing density correction on the original color image based on the second set of image data.

5. The image correcting method according to claim 4, wherein:
the first set of image data is determined by selecting data of one pixel from the original color image data representing the original color image every predetermined number of pixels; and
the second set of image data is determined by calculating an average value from the original color image data every predetermined number of pixels.

6. The image correcting method according to claim 4, wherein the higher spatial frequency components include a number of data portions to be a neutral color.

7. The image correcting method according to claim 4, wherein when the higher spatial frequency components are removed from or reduced from the original color image in the second set of image data, variations of luminance in the original color image becomes averaged in the second set of image data.

8. An image correcting method comprising the steps of:
determining an average value relating to chromaticity per first small region of a small area at points on an original color image;
determining an average relating to luminance per second small region greater in area than the first small region at the points on the original color image; and
performing color correction on the original color image based on the average value relating to the chromaticity and performing density correction on the original color image based on the average value relating to the luminance.

9. The image correcting method according to claim 8, wherein the value relating to the chromaticity includes a high rate of high luminance points or low luminance points located in the original color image.

10. An image correcting apparatus comprising:
color correction means for performing color correction on an original color image based on a first set of image data including higher spatial frequency components of the original color image; and density correction means for performing density correction on the original color image based on a second set of image data having a different frequency component than the first set of image data in which the higher spatial frequency components are removed or reduced from the original color image.

11. The image correcting method according to claim 10, wherein the higher spatial frequency components include a number of data portions to be a neutral color.

12. The image correcting method according to claim 10, wherein when the higher spatial frequency components are removed from or reduced from the original color image in the second set of image data, variations of luminance in the original color image becomes averaged in the second set of image data.

13. An image correcting apparatus comprising:

arithmetical means for determining, from an original color image, a first set of image data including higher spatial frequency components of the original color image and a second set of image data having a different frequency component than the first set of image data in which the higher spatial frequency components are removed or reduced from the original color image; and correction means for performing color correction on the original color image based on the first set of image data and for performing density correction on the original color image based on the second set of image data.

14. The image correcting method according to claim 13, wherein the higher spatial frequency components include a number of data portions to be a neutral color.

15. The image correcting method according to claim 13, wherein when the higher spatial frequency components are removed from or reduced from the original color image in the second set of image data, variations of luminance in the original color image becomes averaged in the second set of image data.

16. A storage medium storing therein programs for allowing a computer to execute processing including a step of performing color correction on an original color image based on a first set of image data including higher spatial frequency components of the original color image, and a step of performing density correction on the original color image based on a second set of image data having a different frequency component than the first set of image data in which the higher spatial frequency components are removed or reduced from the original color image.

17. A storage medium storing therein programs for allowing a computer to execute processing including a first step of determining, from an original color image, a first set of image data including higher spatial frequency components of the original color image and a second set of image data having a different frequency component than the first set of image data in which the higher spatial frequency components are removed or reduced from the original color image; and the second step of performing color correction on the original color image based on the first set of image data and performing density correction on the original color image based on the second set of image data.

* * * * *

UNITED STATES PATENT AND TRADEMARK OFFICE
CERTIFICATE OF CORRECTION

PATENT NO. : 6,711,285 B2  
DATED : March 23, 2004  
INVENTOR(S) : Takafumi Noguchi It is certified that error appears in the above-identified patent and that said Letters Patent is hereby corrected as shown below:

<u>Title page</u>,  
Item [30], Foreign Application Priority Data, should read as follows:  
-- Sept. 8, 1998 (JP)     10-253655 --

Signed and Sealed this

Tenth Day of August, 2004

JON W. DUDAS  
*Acting Director of the United States Patent and Trademark Office*